(12) United States Patent
Selvan et al.

(10) Patent No.: US 7,162,927 B1
(45) Date of Patent: Jan. 16, 2007

(54) DESIGN OF A WET/WET AMPLIFIED DIFFERENTIAL PRESSURE SENSOR BASED ON SILICON PIEZORESISTIVE TECHNOLOGY

(75) Inventors: Thirumani A. Selvan, Bangalore (IN); Gururaj U. Shenoy, Bangalore (IN); Saravanan Sadasivan, Bangalore (IN); Raghavendra Muniraju, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/305,676

(22) Filed: Dec. 16, 2005

(51) Int. Cl.
*G01L 9/00* (2006.01)

(52) U.S. Cl. ............... 73/753; 73/706; 73/714; 73/756

(58) Field of Classification Search .......... 73/700–756; 361/283.1–283.4
See application file for complete search history.

(56) References Cited

U.S. PATENT DOCUMENTS

| | | | | |
|---|---|---|---|---|
| 3,817,107 A | * | 6/1974 | Shimada | 73/727 |
| 3,869,920 A | * | 3/1975 | Miyauchi | 73/722 |
| 4,651,433 A | * | 3/1987 | Mohr | 33/367 |
| 4,895,026 A | * | 1/1990 | Tada | 73/721 |
| 5,184,107 A | | 2/1993 | Maurer | 338/42 |
| 5,402,683 A | * | 4/1995 | Kosugi et al. | 73/756 |
| 6,117,292 A | | 9/2000 | Ahmad | 204/416 |
| 6,153,070 A | | 11/2000 | Maurer et al. | 204/416 |
| 6,637,272 B1 | * | 10/2003 | Bariere | 73/715 |

\* cited by examiner

*Primary Examiner*—Edward Lefkowitz
*Assistant Examiner*—Jermaine Jenkins
(74) *Attorney, Agent, or Firm*—Roberts & Roberts, LLP (57) ABSTRACT

The invention provides pressure sensors for use in wet environments. A pressure sensor package according to the invention has a housing having a pair of cavities separated by a wall member. Sequentially contained within one cavity is a conductive elastomeric seal pad, a pressure sensor and an elastomeric media seal. A pressure cap is attached to the housing such that the pressure cap and the housing together form a hermetic seal. The pressure cap has a port for admitting a gas under pressure into the first cavity. A signal amplifier is positioned within the second cavity and a cover encloses the signal amplifier within the second cavity. An electrical connector through the wall member forms an electrical connection between the pressure sensor and the signal amplifier. A lead frame extends through the housing and forms electrical connections with the pressure sensor and the signal amplifier.

23 Claims, 6 Drawing Sheets

DESIGN OF A WET/WET AMPLIFIED DIFFERENTIAL PRESSURE SENSOR BASED ON SILICON PIEZORESISTIVE TECHNOLOGY

BACKGROUND OF THE INVENTION

1. Field of the Invention

The present invention relates to pressure sensors or more particularly to pressure sensors for use in wet environments.

2. Description of the Related Art

In wet applications, a pressure sensor comes into contact with fluids and gases having high moisture content. This moisture damages the wire bonds that are used for bonding the sensor and piezoresistors that are doped on the surface of the sensor. As a result, silicon piezoresistive sensing technology has heretofore only been used directly for dry media applications and has been used by protecting it with epoxy for wet applications. However, there is also a great need in the art for measuring pressures in wet media directly as epoxy interferes with the measurements. There is also a need for an amplified pressure sensor for such applications. Some applications additionally need to have signal conditioning/signal amplification incorporated in sensor packages. Most wet differential pressure sensors employ a metal capacitive pressure sensor. Currently there is no wet differential amplified pressure sensor based on piezoresistive sensing technology with a surface mounted technology (SMT) package. A SMT packaged pressure sensor provides a small, low cost, high value pressure sensor that could be mounted on a printed circuit board (PCB) with smaller pad dimensions, thus ensuring less space occupied on the PCB. This also helps in lowering installation costs and eliminates secondary operations. This sensor could meet the needs of many medical sensor applications that need a SMT package and also where an amplified pressure reading is used.

It is known in the art to produce sensor packages. U.S. Pat. No. 6,117,292 provides a chemical sensor apparatus in which an ion sensitive silicon die is sandwiched between an elastomeric media seal and a conductive elastomeric pad contained within a housing. U.S. Pat. No. 6,153,070 provides a sensor packaging using a heat staking technique. An environmental sensor apparatus is disclosed in which an environmentally sensitive silicon die is sandwiched between an elastomeric media seal and a conductive elastomeric pad contained within a housing. U.S. Pat. No. 5,184,107 provides a piezoresistive pressure transducer with a conductive elastomeric seal. A piezoresistive pressure transducer uses pre-molded elastomeric seals in which at least one seal is electrically conductive. A piezoresistive stress sensitive element in the form of a diaphragm of semiconductor material having a thickened rim is held at its rim between a pair of pre-molded elastomeric seals in a two-piece housing. None of these employ a pressure sensor positioned in one compartment of a housing and a signal amplifier positioned in a separated compartment of the housing so that the signal amplifier is separated from a relatively harsh, wet, pressure sensing environment.

It has now been found that an improved sensor package can be prepared by partitioning a plastic housing into two halves. In one of the halves, a pressure sensor is sandwiched between an electrically conductive seal and elastomeric media seal and in the other half a signal amplifier in the form of an application specific integrated circuit (ASIC) is provided. The cap over the ASIC is ultrasonically welded while the cap over the pressure sensor can be ultrasonically welded or heat staked. The conductive seal can replace wire bonds for establishing electrical contact between the pressure sensor and the lead frame. The elastomeric seal, i.e., media seal is used to isolate the fluid from attacking the metal contacts on the sensor surface. To incorporate amplification to the sensor output, an ASIC/instrumentation amplifier/operational amplifier can be employed. An ASIC may bring about signal conditioning along with amplification. When an ASIC is incorporated in this type of arrangement it would avoid contact with the fluids or moisture present in the gases which could damage the ASIC functionality. In this regard, the mechanical packaging arrangement of the invention partitions the housing into two halves. In one of the half the pressure sensor with the conductive seal and media seal is packaged and in the other half an ASIC is packaged.

SUMMARY OF THE INVENTION

The invention provides a pressure sensor package which comprises:

a) a housing having a first cavity and a second cavity within the housing, and a wall member separating the first cavity and the second cavity;

b) a conductive elastomeric pad positioned within the first cavity;

c) a pressure sensor positioned on the conductive elastomeric pad;

d) an elastomeric media seal positioned on the pressure sensor;

e) a pressure cap on the elastomeric media seal, which pressure cap is attached to the housing such that the pressure cap and the housing together form a hermetic seal which prevents the escape or entry of a gas through the hermetic seal; said pressure cap further having a port therethrough for admitting a gas under pressure into the first cavity;

f) a signal amplifier positioned within the second cavity, and a cover on the second cavity which encloses the signal amplifier within the second cavity;

g) an electrical connector through the wall member forming an electrical connection between the pressure sensor and the signal amplifier;

h) a lead frame comprising a plurality of electrical connectors extending through the housing, said lead frame forming electrical connections with the pressure sensor and the signal amplifier.

The invention also provides a method of producing a pressure sensor package which comprises:

a) providing a housing having a first cavity and a second cavity within the housing, and a wall member separating the first cavity and the second cavity;

b) positioning a conductive elastomeric pad within the first cavity;

c) positioning a pressure sensor on the conductive elastomeric pad;

d) positioning an elastomeric media seal on the pressure sensor;

e) attaching a pressure cap to the housing over the elastomeric seal, such that the pressure cap and the housing together form a hermetic seal which prevents the escape or entry of a gas through the hermetic seal; said pressure cap further having a port therethrough for admitting a gas under pressure into the first cavity;

f) positioning a signal amplifier within the second cavity, and then positioning a cover on the second cavity which encloses the signal amplifier within the second cavity;

g) providing an electrical connector through the wall member and forming an electrical connection between the pressure sensor and the signal amplifier;

h) providing a lead frame comprising a plurality of electrical connectors extending through the housing, and forming electrical connections between the lead frame and the pressure sensor and between the lead frame and the signal amplifier.

The invention further provides method of determining the pressure of a fluid which comprises:

i) providing a pressure sensor package which comprises:

a) a housing having a first cavity and a second cavity within the housing, and a wall member separating the first cavity and the second cavity;

b) a conductive elastomeric pad positioned within the first cavity;

c) a pressure sensor positioned on the conductive elastomeric pad;

d) an elastomeric media seal positioned on the pressure sensor;

e) a pressure cap on the elastomeric media seal, which pressure cap is attached to the housing such that the pressure cap and the housing together form a hermetic seal which prevents the escape or entry of a gas through the hermetic seal; said pressure cap further having a port therethrough for admitting a gas under pressure into the first cavity;

f) a signal amplifier positioned within the second cavity, and a cover on the second cavity which encloses the signal amplifier within the second cavity;

g) an electrical connector through the wall member forming an electrical connection between the pressure sensor and the signal amplifier;

h) a lead frame comprising a plurality of electrical connectors extending through the housing, said lead frame forming electrical connections with the pressure sensor and the signal amplifier;

ii) flowing a fluid through the port into the first cavity;

iii) measuring the pressure of the fluid in the cavity with the pressure sensor and issuing an electrical signal corresponding to the measured pressure from the pressure sensor to the signal amplifier;

iv) amplifying the electrical signal corresponding to the measured pressure from the pressure sensor with the signal amplifier to form an amplified signal, and issuing the amplified signal to an electrical connection with the lead frame;

v) presenting indicia corresponding to the measured pressure on a display electrically connected to the lead frame.

DESCRIPTION OF THE INVENTION

Figure 1:
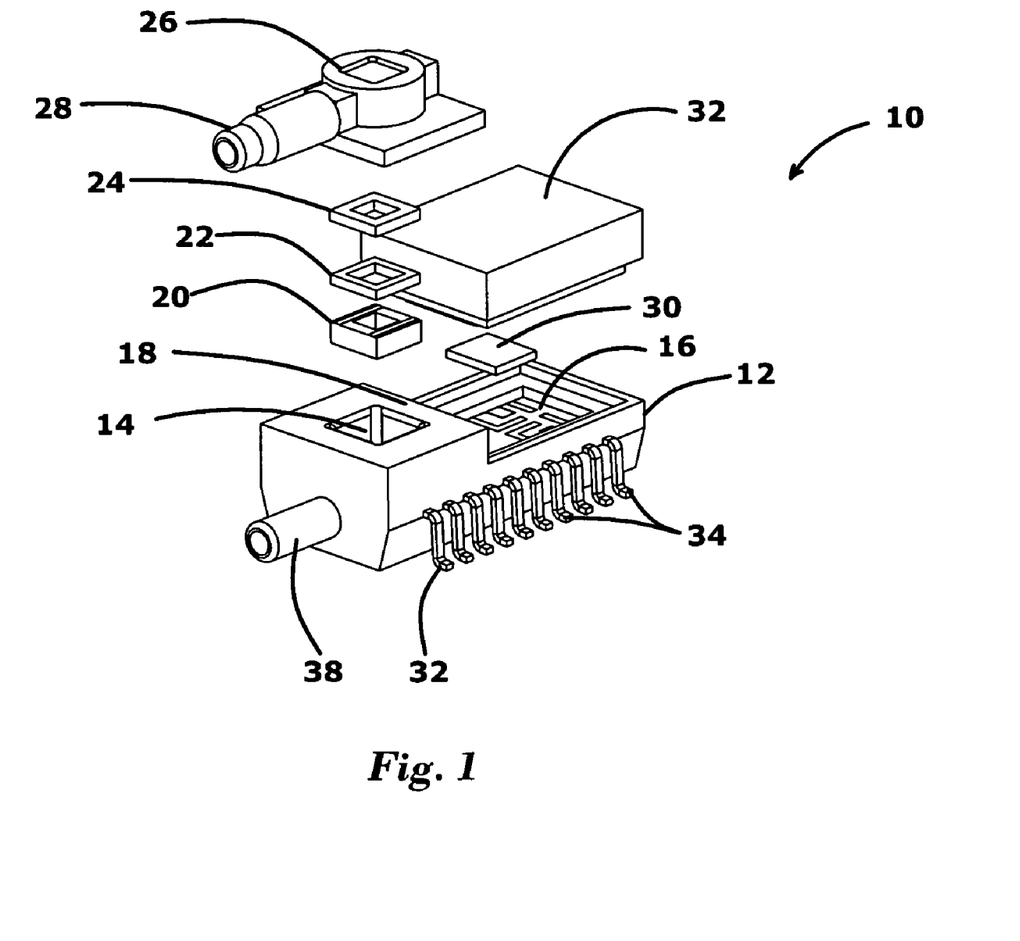
FIG. 1 shows an exploded perspective view of a pressure sensor package according to the invention.
Figure 2:
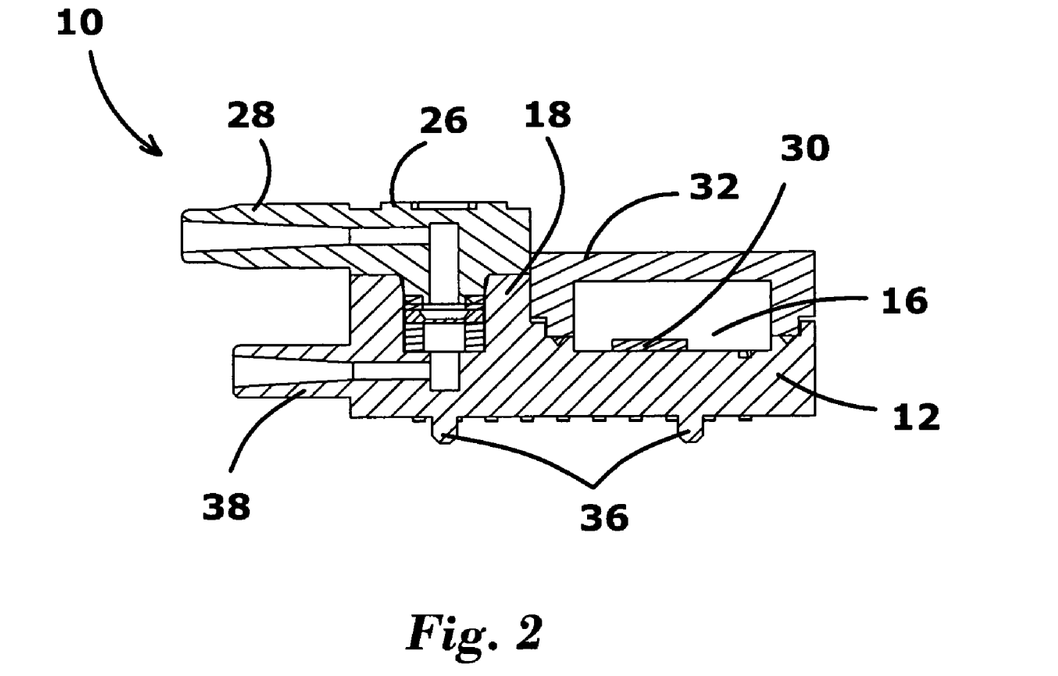
FIG. 2 shows a cross sectional view of a pressure sensor package according to the invention.
Figure 3:
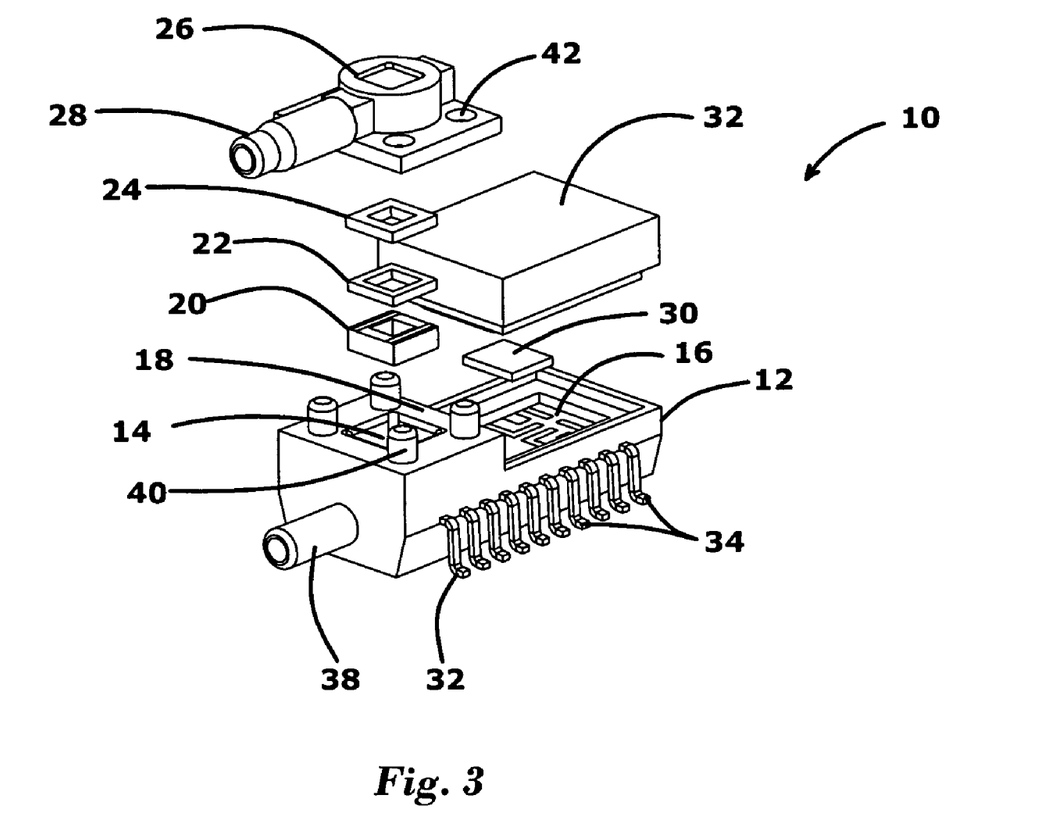
FIG. 3 shows an exploded perspective view of an alternate embodiment of the sensor package according to the invention wherein the pressure cap is attached to the housing by a plurality of posts.

Referring to FIG. 1 and FIG. 2, there is shown an embodiment of the sensor package 10 according to the invention. The sensor package is shown to have a housing 12 having a first cavity 14 and a second cavity 16 within the housing 12. A wall member 18 separates the first cavity 14 and the second cavity 16. Sequentially sandwiched within the first cavity 14 is an electrically conductive elastomeric pad 20 positioned within the first cavity, a pressure sensor 22 electrically conductive elastomeric pad 20 and an elastomeric media seal 24, positioned on the pressure sensor 22. Then a pressure cap 26 covers the elastomeric media seal. The pressure cap 26 is attached to the housing 12 such that the pressure cap 26 and the housing 12 together with the electrically conductive elastomeric pad 20, a pressure sensor 22 and elastomeric media seal 24, form a hermetic seal which prevents the escape or entry of a gas through the hermetic seal. In the embodiment shown in FIG. 1, the pressure cap 26 is fit over housing 12 and the pressure cap is ultrasonically welded to the housing. In the embodiment of FIG. 3, corresponding holes 42 through pressure cap 26 is press fit over posts 40 in housing 12 and heated to a permanent seal. The pressure cap 26 further has a port 28 therethrough for admitting a gas under pressure into the first cavity 14. Positioned within the second cavity 16 is a signal amplifier 30. A cover 32 positioned on the second cavity 16 encloses the signal amplifier 30 within the second cavity 16. An electrical connector preferably positioned through the wall member 18 forms an electrical connection between the pressure sensor 22 and the signal amplifier 30. A lead frame 32 comprising a plurality of electrical connectors 34 extend through the housing 12. The lead frame 32 forms electrical connections with the pressure sensor 22 and the signal amplifier 30 to an external circuit which may be on a printed circuit board, not shown. The entire sensor package 10 may be mounted on a printed circuit board using locator pins 36 as seen in FIG. 2. In another embodiment of the invention, the pressure sensor package may further comprise a second port 38 through the housing 12 for admitting a gas under pressure into the first cavity 14. When a second port 38 is used, the pressure sensor package may measure a differential pressure between gases entering port 28 as compared to those entering port 38.

In a useful embodiment, the housing 12, pressure cap 26, ports 28 and 38, posts 40 and cover 32 are constructed of a plastic material and is preferably any thermoplastic engineering grade plastic suitable for the intended sensing environment. These are of a material selected to withstand the type of media environment to which the pressure sensor is to be exposed. The elastomeric media seal 24 is sized to have its side walls fit in abutting contact with the walls of the 14. The media seal 24 preferably has a central through-hole for alignment with the first cavity hole 14. The media seal may be composed of an elastomeric material, impervious to the media to which the pressure sensor is designed to be exposed. One suitable material is ethylene propylene diene monomer (EDPM) of 50–60 durometer with 10% to 35% compression which may be used for preventing the media environment from entering into the first cavity 14 and the internal components of the pressure sensor. It should be noted, that even though an elastomeric material is used herein to compose the media seal, it will be well understood by those skilled in the art that other materials and techniques can be substituted such as gaskets, sealing compounds or the like, that are conformable so as to provide a hermetic seal between the sensor apparatus electronics and the media environment. It will be understood by those skilled in the art that the heat sealing method just described is one of many methods that can be used to provide a hermetic seal of the housing 12, such as employing material fusion techniques using lasers, ultrasonics, radiant heat or the like. Additionally, hermetic sealing may also be accomplished by the application of a liquid or semi-liquid sealing compound to effectively form a hermetic seal.

The pressure sensor or die 22 is designed to abut the media seal 24 on a first side thereof. A second side of the pressure sensor contains a pattern of electrical leads as necessary for the operation of the package. One or more leads are connected to the signal amplifier 30 and others attached to one or more electrical connectors 34. Pressure sensors useful for this invention are well known in the art and generally commercially available. Suitable sensors are silicon piezoresistive sensors such as a MEMS silicon piezoresistive sensors. Other suitable sensors are commercially available from Honeywell International Inc. as a model 24 PC pressure sensor. In one embodiment the pressure sensor has a first side with a sensing area and a second opposing side with patterned electrical leads in electrical communication with the elastomeric conductive seal 20. The sensing area is in fluid communication with the first cavity 14.

Abutting the second side of the pressure sensor 22 is an elastomeric conductive seal 20 commercially known as a "silver stacks connector" with conductive silver strips placed therein to allow electrical conduction through the thickness of the conductive seal, thereby providing electrical connection between the pressure sensor 22 and the lead frame conductors 34 when the components are loaded in opposition to each other within the housing 14. Conductive elastomeric seals useful for this invention non-exclusively include the conductive area which consists of repeating layers of silicone rubber and silver impregnated silicone rubber. Because the nonconductive layers of silicone rubber act as an insulator for the silver impregnated silicone rubber stripes, current is only conducted between the opposing sides of the conductive elastomeric seal. The alternating the silicone rubber layers and the silver impregnated layers are known as the Standard Silver Stax, and this material is manufactured by Elastomeric Technology, Inc. Positioned within the second cavity 16 is a signal amplifier 30 which is in electrical contact with the pressure sensor and amplifies a signal from the pressure sensor representative of the pressure of a fluid such as air or air and water vapor within the first cavity 14. The signal amplifier is preferably an application specific integrated circuit (ASIC) which is well known in the art. ASIC's can also be used for signal-conditioning a MEMS silicon piezoresistive sensor. The ASIC may be employed to calibrate and compensate the pressure sensor with a total error of less than ±1% full scale output (FSO) over its operating pressure range. The total error includes effects due to offset and sensitivity, as well as the offset and sensitivity temperature coefficients. ASIC's are useful because a typical output signal for a piezoresistive pressure sensor depends on temperature. Useful ASIC's include a DSP-based circuit from Fujikura Ltd. in Tohoku, Japan that corrects for the sensor's offset and sensitivity. Fujikura's circuit operates from −30° C. to 80° C. Fujikura's ASIC is made on a 0.7-pm double-polysilicon, double-metal, n-well CMOS process. It has a sigma-delta 16-bit analog-to-digital converter, a reference voltage with a built-in temperature sensor, the 16-bit DSP core, 101 polysilicon fuses, a step-up voltage regulator, a 10-bit digital-to-analog converter (DAC), and a 4-MHz oscillator. Corrected coefficients are stored using the polysilicon fuses. The output code is accessible with a serial interface or an analog signal provided by a 10-bit DAC. This circuit also compensates for secondary temperature characteristics. It has an 120 serial interface. A built-in charge pump lets it work in circuits rated under 3 V. A "sleep" mode reduces power consumption. Another ASIC is produced by The Institute of Microelectronics in Singapore which is a fully customized analog ASIC with a fusible-link array that achieves the aforementioned performance from −40° C. to 125° C. It is made on a 0.8-pm double-polysilicon, double-metal CMOS process. The ASIC consists of a core analog signal processor, a 64-bit fusible link array, and a serial fusible-link interface. The ASIC's digital portion provides the interface between the analog signal processor and controller. This controller writes data to an interface and reads data back from it by a serial-in and serial-out communications protocol. Data in the serial interface can be loaded into the fusible-link array to control various resistor networks in the analog signal processor. These resistor networks are used for various programmable functions. All of these programmable elements make it possible to compensate for the calibration, sensitivity, and temperature effects to the first order. The ASIC features an output of 0.5 to 4.5 V using a 5-V power supply. Other suitable signal amplifiers useful for this invention non-exclusively include a ZMD31050 RB$^{IC}$ series advanced differential sensor signal conditioner, commercially available from ZMD America Inc, of Melville, N.Y.

Referring again to FIGS. 1–3, it can be seen that the media seal 22 is placed in the first cavity 14 which communicates with the first cavity hole. The pressure sensor 22 is then placed in the first cavity 14 in contact with media seal 24 so that its sensing area is aligned with the media seal 24, placing the patterned electrical leads of the pressure sensor 22 towards the conductive seal 20. The conductive seal 20 is placed in the first cavity 14 so that its conductive strips contact patterned electrical leads of the pressure sensor 22. Once the pressure cap 26 is press fit onto housing 14, posts 40 may serve as a molding element. In one case the pressure cap 26 is brought down over the posts 40 and heat melted together with the housing 12. The post material then melts and flows into the pressure cap holes to melt set the plastic, thereby providing a substantially flush covering with a hermetic seal. Posts 4 extend through the pressure cap as seen in FIG. 3. Alternatively, the pressure cap and housing may be ultrasonically sealed. The posts are then optional. At this point, all components of the pressure sensor sandwich within the first cavity are substantially locked in place.

Figure 4:
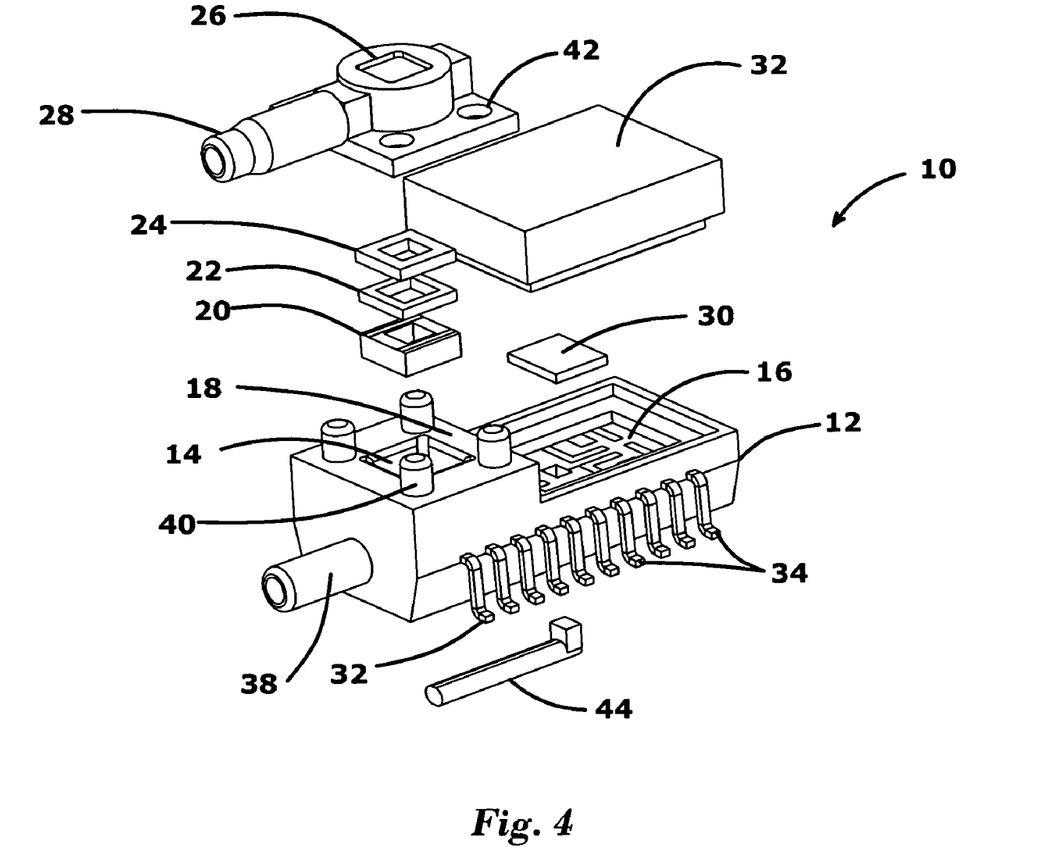
FIG. 4 shows an exploded perspective view of another embodiment of a pressure sensor package having a metal thermal conductivity channel between the pressure sensor cavity and the signal amplifier cavity.
Figure 5:
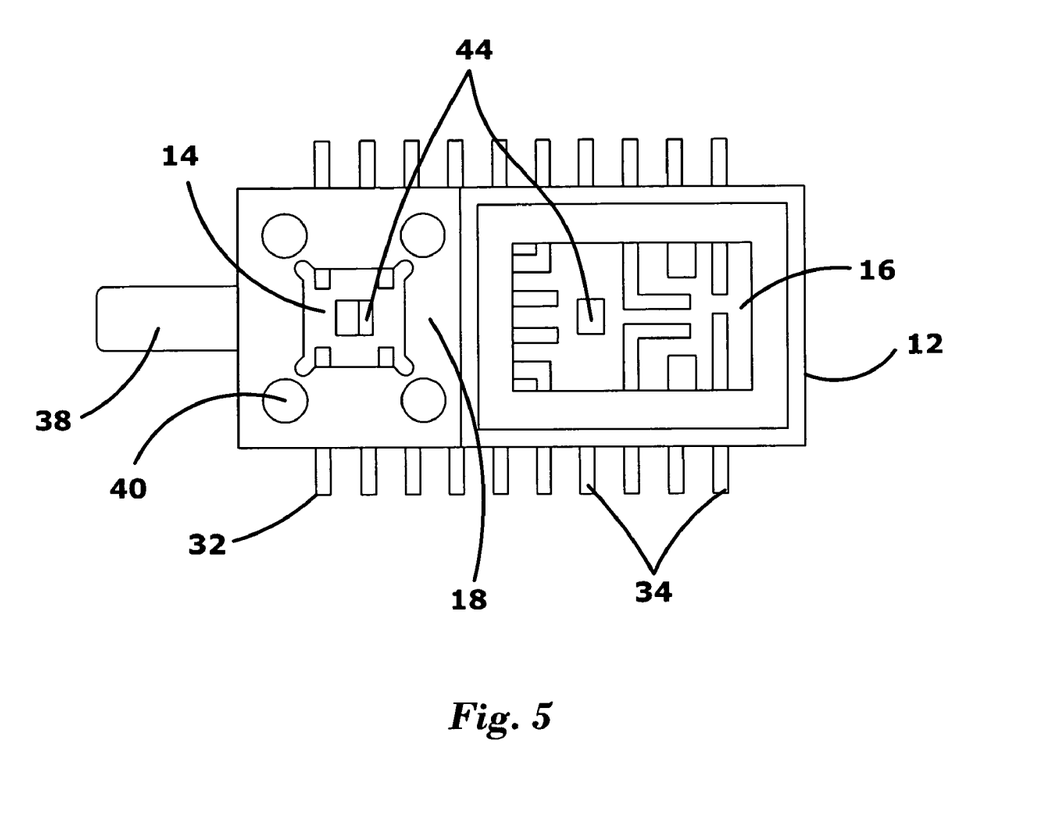
FIG. 5 shows a top view of the embodiment of FIG. 4.
Figure 6:
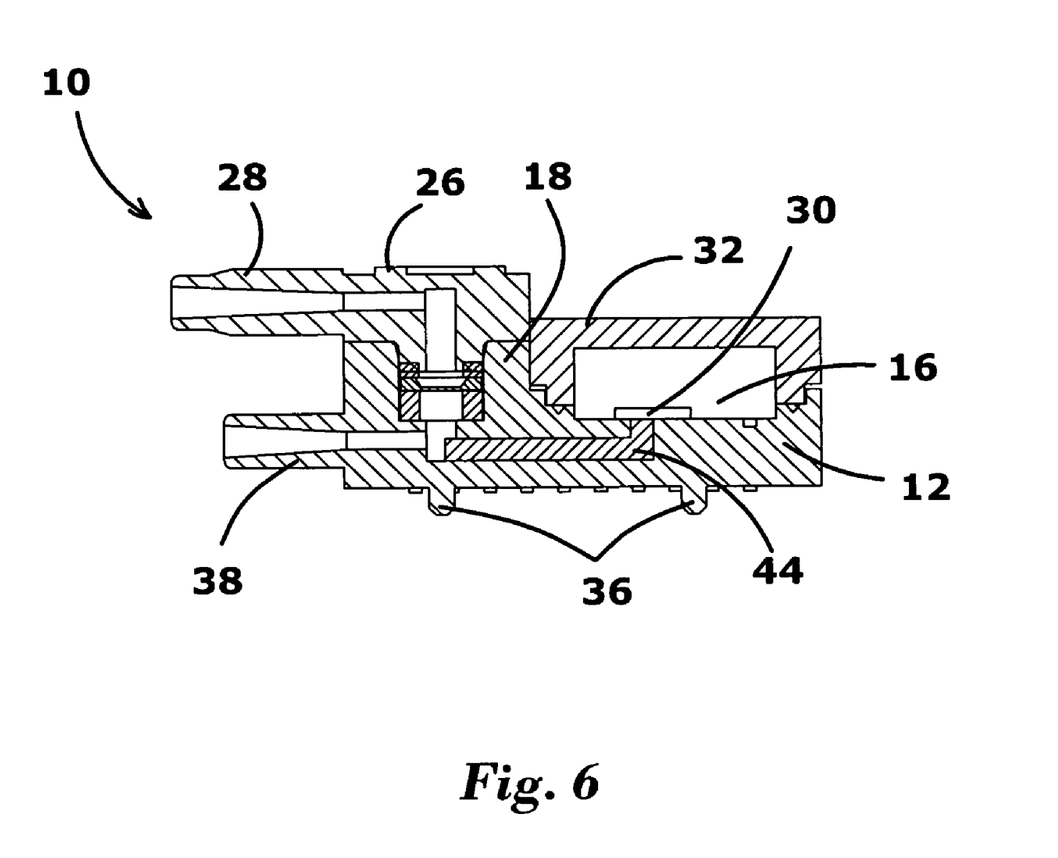
FIG. 6 shows a cross sectional view of the embodiment of FIG. 4.

Another embodiment of the invention is shown in FIGS. 4–6. In order to sense the media temperature in the wet—wet pressure sensor, the pressure cavity needs to be isolated from ASIC (signal conditioning) cavity. The media temperature is sensed to compensate for temperature related errors of the sensing piezoresistive bridge by the ASIC. In this embodiment, again there are two cavities, a first cavity 14 for accommodating the pressure sensor die and a second cavity 16 for accommodating the ASIC. The ASIC has a built-in temperature sensor for thermal compensation. However, in the configuration of FIGS. 1–3, the second cavity 16 is thermally and physically isolated from the media for wet—wet applications. In this case, the ASIC would only sense the ambient temperature in its second cavity 16 and not the media temperature within the first cavity 14, which is of importance for thermal compensation.

FIGS. 4–6 show another embodiment of a pressure sensor package having a thermal conduction channel 44, which extends between the pressure sensor cavity 14 and the signal amplifier cavity 16. The thermal conduction channel 44 ensures that the temperature in the second cavity 16 is substantially the same as in the first cavity 14. The thermal conduction channel 44 is preferably composed of a highly thermally conductive material like metal or thermal potting compound. The optimal cross-section area and channel length may easily be determined by those skilled in the art in order to ensure lesser thermal loss and faster thermal response. This thermal conduction channel aids in the transfer of the media temperature from pressure media containing first cavity 14 to the ASIC containing second cavity 16 while still isolating the ASIC containing second cavity 16 from the wet pressure media. The use of a thermal conduction channel and an ASIC which has a built-in temperature sensor eliminates a need for an additional thermal sensor in the piezoresistive die containing first cavity 14 and also eliminates the required interconnects to connect the thermal sensor to the ASIC. This affords an ideal way of temperature compensation for a SMT pressure sensor package, were there is no space on a PCB for an additional thermal sensor and related interconnects to be incorporated. This also takes advantage of a built-in thermal sensor in the ASIC and eliminates introducing another thermal sensor as a part of the piezoresistive pressure sensor die. This affords a low cost, compact, easy to implement technique where both the piezoresistive pressure sensor and the signal conditioning ASIC see the same temperature and thus makes calibration more accurate.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A pressure sensor package which comprises:
   a) a housing having a first cavity and a second cavity within the housing, and a wall member separating the first cavity and the second cavity;
   b) a conductive elastomeric pad positioned within the first cavity;
   c) a pressure sensor positioned on the conductive elastomeric pad;
   d) an elastomeric media seal positioned on the pressure sensor;
   e) a pressure cap on the elastomeric media seal, which pressure cap is attached to the housing such that the pressure cap and the housing together form a hermetic seal which prevents the escape or entry of a gas through the hermetic seal; said pressure cap further having a port therethrough for admitting a gas under pressure into the first cavity;
   f) a signal amplifier positioned within the second cavity, and a cover on the second cavity which encloses the signal amplifier within the second cavity;
   g) an electrical connector through the wall member forming an electrical connection between the pressure sensor and the signal amplifier;
   h) a lead frame comprising a plurality of electrical connectors extending through the housing, said lead frame forming electrical connections with the pressure sensor and the signal amplifier.

2. The pressure sensor package of claim 1 further comprising a second port through the housing for admitting a gas under pressure into the first cavity.

3. The pressure sensor package of claim 1 wherein the lead frame forms an electrical connection between the pressure sensor and a circuit and an electrical connection between the signal amplifier and a circuit.

4. The pressure sensor package of claim 1 further comprising a printed circuit board having at least one circuit thereon; wherein the lead frame forms an electrical connection between the pressure sensor and a circuit on the printed circuit board and the lead frame forms an electrical connection between the signal amplifier and a circuit on the printed circuit board.

5. The pressure sensor package of claim 1 wherein the pressure cap is attached to the housing by an ultrasonic weld.

6. The pressure sensor package of claim 1 wherein the pressure cap is attached to the housing by a plurality of posts.

7. The pressure sensor package of claim 1 wherein the cover is attached to the housing by an ultrasonic weld.

8. The pressure sensor package of claim 1 wherein the pressure sensor comprises a piezoresistive pressure sensor.

9. The pressure sensor package of claim 1 wherein the signal amplifier comprises an integrated circuit.

10. The pressure sensor package of claim 1 further comprising a thermal conduction channel extending from the first cavity to the second cavity.

11. A method of producing a pressure sensor package which comprises:
    a) providing a housing having a first cavity and a second cavity within the housing, and a wall member separating the first cavity and the second cavity;
    b) positioning a conductive elastomeric pad within the first cavity;
    c) positioning a pressure sensor on the conductive elastomeric pad;
    d) positioning an elastomeric media seal on the pressure sensor;
    e) attaching a pressure cap to the housing over the elastomeric seal, such that the pressure cap and the housing together form a hermetic seal which prevents the escape or entry of a gas through the hermetic seal; said pressure cap further having a port therethrough for admitting a gas under pressure into the first cavity;
    f) positioning a signal amplifier within the second cavity, and then positioning a cover on the second cavity which encloses the signal amplifier within the second cavity;
    g) providing an electrical connector through the wall member and forming an electrical connection between the pressure sensor and the signal amplifier;
    h) providing a lead frame comprising a plurality of electrical connectors extending through the housing, and forming electrical connections between the lead frame and the pressure sensor and between the lead frame and the signal amplifier.

12. The method of claim 11 further comprising a second port through the housing for admitting a gas under pressure into the first cavity.

13. The method of claim 11 comprising forming an electrical connection between the lead frame and the pressure sensor and a circuit and forming an electrical connection between the signal amplifier and a circuit.

14. The method of claim 11 further comprising providing a printed circuit board having at least one circuit thereon; and forming an electrical connection with the lead frame between the pressure sensor and a circuit on the printed circuit board; and forming an electrical connection with the lead frame between the signal amplifier and a circuit on the printed circuit board.

15. The method of claim 11 comprising attaching the pressure cap to the housing by an ultrasonic weld.

16. The method of claim 11 comprising attaching the pressure cap to the housing by a plurality of posts.

17. The method of claim 11 comprising attaching cover to the housing by an ultrasonic weld.

18. The method of claim 11 wherein the pressure sensor comprises a piezoresistive pressure sensor.

19. The method of claim 11 wherein the signal amplifier comprises an integrated circuit.

20. The method of claim 11 wherein the pressure sensor package further comprises a thermal conduction channel extending from the first cavity to the second cavity.

21. A method of determining the pressure of a fluid which comprises:
  i) providing a pressure sensor package which comprises:
    a) a housing having a first cavity and a second cavity within the housing, and a wall member separating the first cavity and the second cavity;
    b) a conductive elastomeric seal pad positioned within the first cavity;
    c) a pressure sensor positioned on the conductive elastomeric pad;
    d) an elastomeric media seal positioned on the pressure sensor;
    e) a pressure cap on the elastomeric media seal, which pressure cap is attached to the housing such that the pressure cap and the housing together form a hermetic seal which prevents the escape or entry of a gas through the hermetic seal; said pressure cap further having a port therethrough for admitting a gas under pressure into the first cavity;
    f) a signal amplifier positioned within the second cavity, and a cover on the second cavity which encloses the signal amplifier within the second cavity;
    g) an electrical connector through the wall member forming an electrical connection between the pressure sensor and the signal amplifier;
    h) a lead frame comprising a plurality of electrical connectors extending through the housing, said lead frame forming electrical connections with the pressure sensor and the signal amplifier;
  ii) flowing a fluid through the port into the first cavity;
  iii) measuring the pressure of the fluid in the cavity with the pressure sensor and issuing an electrical signal corresponding to the measured pressure from the pressure sensor to the signal amplifier;
  iv) amplifying the electrical signal corresponding to the measured pressure from the pressure sensor with the signal amplifier to form an amplified signal, and issuing the amplified signal to an electrical connection with the lead frame;
  v) presenting indicia corresponding to the measured pressure on a display electrically connected to the lead frame.

22. The method of claim 21 wherein the pressure sensor package further comprises a second port through the housing for admitting a gas under pressure into the first cavity; flowing a second fluid through the second port into the first cavity; and step (iii) comprising measuring the differential pressure between the fluid and the second fluid.

23. The method of claim 21 wherein the pressure sensor package further comprises a thermal conduction channel extending from the first cavity to the second cavity.

* * * * *